United States Patent [19]

Lesner, Jr. et al.

[11] Patent Number: 5,402,475
[45] Date of Patent: Mar. 28, 1995

[54] MONITORING AND CONTROL OF PARKING MANAGEMENT SYSTEM BY REMOTE

[75] Inventors: Paul N. Lesner, Jr., Chesapeake; Keith A. Sherman, Virginia Beach, both of Va.

[73] Assignee: Schlumberger Technologies, Inc., San Jose, Calif.

[21] Appl. No.: 40,924

[22] Filed: Mar. 31, 1993

[51] Int. Cl.⁶ ........................................ H04M 11/00
[52] U.S. Cl. ................................ 379/106; 379/107; 379/95; 379/102; 379/97
[58] Field of Search ............... 379/106, 107, 102, 104, 379/105, 95, 97, 98; 340/870.02, 870.03, 870.01

[56] References Cited

U.S. PATENT DOCUMENTS

| | | | |
|---|---|---|---|
| 4,720,785 | 1/1988 | Shapiro | 364/401 |
| 4,862,493 | 8/1989 | Venkataraman et al. | 379/107 |
| 4,905,281 | 2/1990 | Surjaatmadja et al. | 379/95 |
| 5,020,097 | 5/1991 | Tanaka et al. | 379/102 |

*Primary Examiner*—Curtis Kuntz
*Assistant Examiner*—Stella L. Woo
*Attorney, Agent, or Firm*—Frishauf, Holtz, Goodman & Woodward

[57] ABSTRACT

Parking machines communicate automatically with service personnel located at a central station in response to the occurrence of a machine error. The service personnel are thus made aware promptly of this situation without having to travel to the site of each parking machine so that appropriate action can be timely taken. The parking machine stores an error signal, and the telephone number of the central station is then dialed. When a communication link is established telephonically, an audible message is generated by the parking machine and transmitted to the central station identifying the parking machine and a machine error. As long as the machine is not serviced, it will re-dial the central station to transmit the error message, and this is repeated at a time interval set according to whether the error has disabled the parking machine or not. The central station is capable of accessing each of the parking machines telephonically to retrieve information stored in memory and to change operating parameters of the parking machines.

8 Claims, 14 Drawing Sheets

MONITORING AND CONTROL OF PARKING MANAGEMENT SYSTEM BY REMOTE

BACKGROUND OF THE INVENTION

The present invention is directed to a technique for monitoring and controlling a parking machine from a remote location and, in particular, determining that a particular parking machine has produced a machine error signal and for enabling a setting or modification of machine operating parameters.

Parking machines for prepaying a fee to park at a designated space have long been known, with a prime example of such being the ubiquitous parking meter placed on the sidewalk at each parking spot, or to cover two adjacent spots, and which consists of mechanical parts. A pointer on the meter is connected to a coin-activated timing mechanism to show whether any time remains on the meter. In more recent times, the parking meter is being gradually replaced by an electrical parking prepayment system which covers a plurality of parking spaces with a single parking machine. More specifically, one type of such an apparatus is a parking machine which includes a clock, a coin and/or bill acceptor, electronic processing circuits, and a printer. Depending upon the amount of money inserted into the parking machine, the printer produces a receipt upon which an expiration time appears. In other words, if the clock indicates that the current time when payment is made is 10:15 a.m., if the hourly parking rate is $5, and if $10 are inserted into the parking machine, then the receipt will have an expiration time of 12:15 p.m. printed on it. This receipt is placed on the dashboard behind the windshield and in clear view of any passing traffic policeman. With this type of apparatus, the specific parking spot being used is not designated on the receipt. As long as the vehicle is parked in a legal spot and if the time on the printed receipt has not expired, then a parking ticket will not be issued. With this arrangement, the parking policeman must individually check the receipt in each and every vehicle.

In a second type of such apparatus, the monitoring by the traffic policeman is simplified because, rather than producing a printed receipt, the expiration time is stored in the memory of the parking machine. In addition to the parking machine components listed above, this type of parking machine is provided with a keypad and a display so that the customer can input the number of a specific parking spot in which his vehicle is located and/or the license number of the vehicle. The expiration time is determined in accordance with the amount of money paid into the parking machine, as described above. A traffic policeman can access that memory to obtain a readout on the display of all parking spaces where the expiration time has passed or is coming up. This type of parking machine is also more convenient for the driver because he does not have to return to the vehicle after paying in order to place the receipt in a clearly visible position.

Due to the capacity of the memory in a parking machine, each one is assigned to designated spaces within a public parking garage, for example. Thus, a 1,000 space public parking garage may need 20 parking machines if each one is capable of covering 50 spaces. The convenience of the user is also a factor which enters into how many spots a machine is designated to cover. If too many spots are covered by a single parking machine, then the customer may be forced to walk an inconveniently long distance to it. This is particularly so with on-street parking where perhaps there are only 10 spaces per block and, thus only 30 spots are within convenient walking distance. However, this arrangement requires the traffic policeman to individually access the information in each parking machine. This can take quite a bit of time and effort. Also, if the driver wants to extend the parking time, he has to return to the same parking machine in order to insert more money. Consequently, it would be helpful in such circumstances to have more flexibility in terms of which parking machines cover which parking spaces.

An enhancement of this latter type is to interconnect a number of the parking machines together. With such an interconnected version, all of the parking machines in, for example, a parking garage share information on all of the parking spaces collectively associated therewith. Thus, the parking machine next to parking spaces 1-50 can even be used to enter information for parking space 695. Likewise, the traffic policeman needs to interrogate only a single parking machine in order to obtain information about all of the 1,000 spaces in the above-mentioned parking garage. U.S. Pat. No. 4,812,805 discloses such an interconnected system. The term "parking machine" is used herein to identify any apparatus having characteristics generally similar to either one of the two above-described types of apparatus.

The parking machines use supplies, such as paper, which are depleted with use. A periodic replacement of the supplies by service personnel is required. However, even though a replacement schedule is maintained at regular intervals, an unexpectedly heavy use at one parking machine may deplete the supplies more quickly than expected. In such a case, the parking machine would be placed out of service for awhile. This would not even be known by the management responsible for the parking machines, and could not be rectified, until the service person comes by on his regular rounds. Consequently, the parking customers may be inconvenienced during the interval between the time when the parking machine goes out of service and when the service personnel corrects the problem. It is also possible that the parking machine, like any electro-mechanical device, will experience a breakdown of some sort which renders it out of order. Again, in this instance the management would have no way of knowing about it until the regularly scheduled visitation by its service personnel which, if such a visit has occurred just prior to the breakdown, may be several days away. Scheduling more frequent visits to each parking machine will ameliorate this situation, but it can result in an unacceptably high increase in labor costs as well as associated expenses such as transportation costs involving gasoline, tolls, and vehicle maintenance. Consequently, it is highly desirable to know the operating status of each parking machine promptly upon a change having occurred therein and without the necessity to increase the frequency of visitations to the parking machine by service personnel.

Each parking machine is preset with certain operating parameters such as the time of day and the parking rate. For example, the parking rate is set, as mentioned above, at $5 per hour. A variable parking rate, depending on the time of day and/or the day of the week can also be preset. For example, a higher rate could be applied before 6:00 p.m. when the heavier demand warrants it, whereas after 6:00 p.m. a lower rate could be advantageous to attract customers during what normally is a low demand period. The data for determining the parking fee is termed fare structure data. If it is desired to change this fare structure data, it must be done on-site at each parking machine by service personnel. This requires the service person to make a special visit or to spend additional time at each machine on a schedule visit and, consequently, additional labor costs ensue. It would be highly desirable to be able to change the fare structure data as well as various operating parameters of a parking machine without the need to resort to a manual operation carried out by service personnel on-site at each parking machine.

SUMMARY OF THE INVENTION

It is an object of the present invention to provide an improved parking payment system.

Another object of the present invention is to provide an improved parking payment system that can detect a change in the operating status of a parking machine without relying on a visit by service personnel to the site of the parking machine.

A further object of the present invention is to provide an improved parking payment system that enables changing the operating characteristics of a parking machine without relying on a manual operation carried out by service personnel at the site of the parking machine.

These and other objects are attained in accordance with one aspect of the present invention directed to a system of parking machines communicating over telephone lines with service personnel who are using communication apparatus such as at a central station. A plurality of parking machines are connected to the same telephone line. The central station includes dialing means for ringing the telephone line, and input means for generating a unique entry code for each of the plurality of parking machines. Each of the plurality of parking machines includes detecting means for detecting a ring on the telephone line and for producing an off-hook condition in response thereto, and control means for maintaining the off-hook condition in response to receipt of the unique entry code for such parking machine.

Another aspect of the present invention is directed to apparatus for generating an audible error message in a system of parking machines communicating over a telephone line to inform the service personnel of a machine error. Each of the parking machines includes memory means for storing, in respective addressable locations, data adapted to (a) identify a particular parking machine, (b) audibly reproduce at least one word, and (c) identify the machine error. A playback means produces an audible and intelligible message from the data stored in the memory means. A control means is responsive to establishment of a communication link on the telephone line between a parking machine and the service personnel to retrieve the data from the addressable locations in the memory means and for providing the retrieved data to the playback means, and thereby transmitting to the service personnel the message including an audible identification of the particular parking machine, a group of at least one word and an identification of the machine error.

A further aspect of the present invention is directed to a system for informing service personnel communicating by telephone lines with a plurality of parking machines that one of the parking machines has a machine error. Each of the plurality of parking machines includes means for detecting that a component of a parking machine has a machine error and for generating a signal indicative thereof. A memory means stores the signal and determines whether the machine error is of a type that requires urgent service. A communication means dials a telephone number of the service personnel to establish a telephonic link therewith. It is then determined whether a telephonic link with the service personnel has been established and, if not, the communication means is repeatedly actuated at a preselected time interval to establish the telephonic link. The preselected interval is set in response to whether or not the machine error is of a type that requires urgent service.

Yet another aspect of the present invention is directed to a system of parking machines communicating over telephone lines with service personnel who are using communication apparatus. The communication apparatus used by the service personnel includes command input means for keying in commands to be transmitted to the parking machines telephonically, and means for establishing a telephonic link with a particular one of the parking machines. Each of the parking machines includes memory means for storing error signals indicative of a machine error and control data for operating the parking machine, and control means for responding to the commands to selectively retrieve the stored machine error and modify the control data.

DETAILED DESCRIPTION OF THE INVENTION

Figure 1:
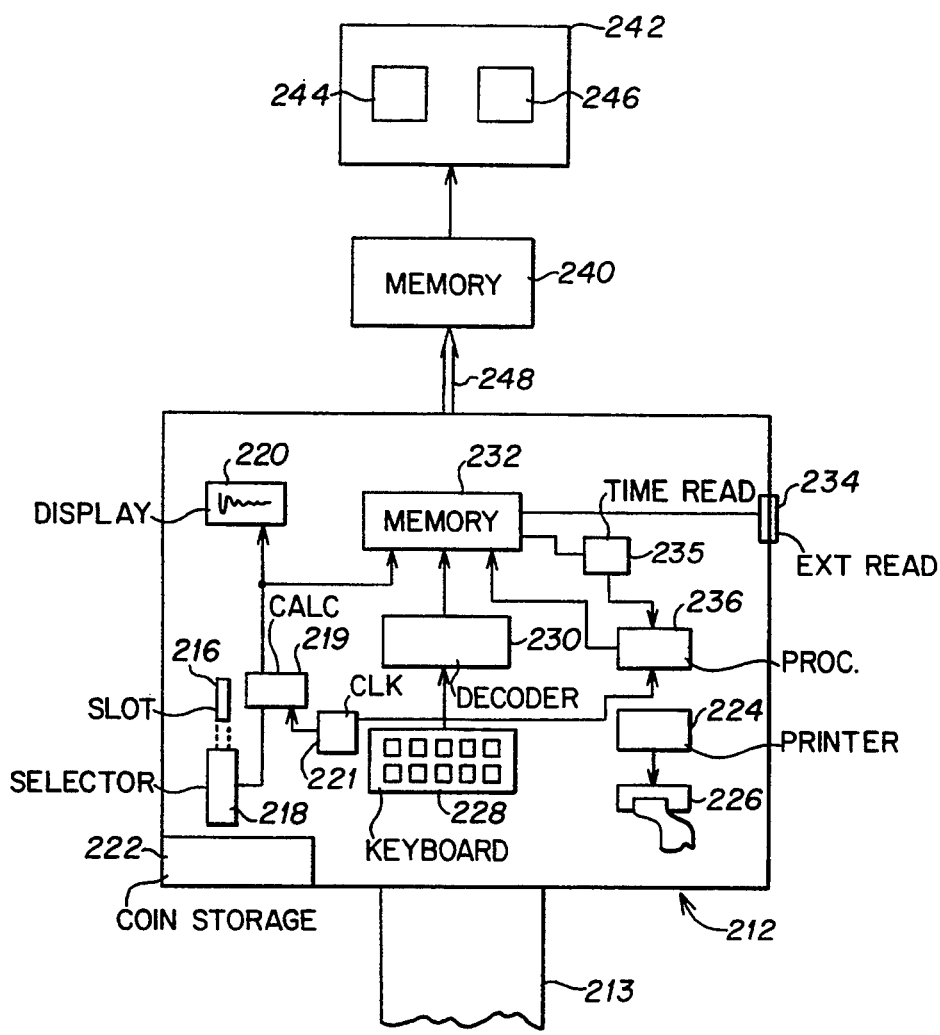
FIG. 1 is a block diagram of a known parking payment system called ParkMaster.

Although the present invention can be used with a variety of parking payment systems and parking machines, as that term is defined above, the preferred embodiment has been adapted for the ParkMaster TM system which is available from Schlumberger Technologies, Inc., Parking and Transit Systems located in Chesapeake, Va. The ParkMaster system can be configured as either one of the two types described above, and its main components are depicted in FIG. 1. Part of FIG. 1 corresponds to system components shown in FIG. 5 of U.S. Pat. No. 4,812,805 and, for the sake of convenience, a description of such components is presented here.

The parking machine identified generally as 212 is supported on a post 213 and includes a slot 216 through which coins are inserted. Coins inserted into slot 216 are checked by a coin selector 218 which determines the denomination of the inserted coins. A calculator 219 determines the time at which paid-up parking expires on the basis of the total amount of money inserted through the slot 216 and the present time as provided by a clock circuit 221. The expiration time is displayed on a display panel 220. After passing through the coin selector 218, the coins are stored in a coin box 222. Parking machine 212 also includes printer 224, e.g. of the thermal head type, suitable for dispensing a printed slip 226 to the driver, with the slip indicating the amount paid and the expiration time. The slip 226 serves merely as a receipt for the payment made by the driver, although it may also serve to remind the driver of the expiration time. The slip 226 is not used in any way for actually checking whether vehicles are in violation, as appears from the following description. Display panel 220 can also be used to show the time of day at all times other than when a fare payment is in progress.

Parking machine 212 further includes a keyboard 228 for enabling the driver, prior to inserting money into the slot 216, to key in data suitable for identifying the parked vehicle. This identification data may be the full license number of the vehicle or merely a portion thereof, or else it may be a number identifying the parking space where the vehicle has been left, in which case each parking space must be marked with a number.

The data inserted via the keyboard 228 is decoded by a decoder 230 and stored in a memory circuit 232. The memory circuit 232 also serves to store the expiration time for the vehicle (as taken from the calculator 219) in conjunction with the vehicle identity data. Thus, memory 232 stores data items in pairs, namely the vehicle identity data and the expiration time of authorized parking. The parking machine also includes external means 234 to enable the data stored in memory 232 to be read from outside of the parking machine.

Parking machine 212 also includes a circuit 235 for reading time data contained in memory 232. This data is read periodically and a circuit 236 compares the time data as read with the present time data as provided by clock 221. If the present time is later than the time data read in the memory (by more than a predetermined period of grace, e.g. three minutes), then circuit 236 deletes the time data as read from memory 232 together with the vehicle identity data. It will, thus, be understood that the pairs of data items stored in memory 232 correspond to properly parked vehicles to within the accuracy of the frequency with which the memory is read (and taking account of the period of grace).

The ParkMaster system currently available has been enhanced relative to that shown in FIG. 1 to accept cards and bills in addition to coins. However, that hardware is not presented herein for the sake of succinctly describing the invention which is not directly related thereto. Components 240 and 242 shown in FIG. 1 are not part of the arrangement disclosed in U.S. Pat. No. 4,812,805, but are included in ParkMaster. Memory 240 and indicator 242 are shown as being coupled to parking machine 212 whereas, in actuality, they can be a part thereof. Memory 240 receives machine error signals from various components of parking machine 212, such as the printer, power supply and coin box. Each of these components is designed to generate a particular, unique signal upon the occurrence of an event that interferes with normal, continuous machine operation (discussed below as a machine error). The error signals are stored in memory 240, and such stored signals are used to illuminate indicator 242. This informs the service personnel of the fact that an error signal has been generated. Indicator 242 includes a green light indicator 244 and a red light indicator 246. Memory 240 can be a part of memory 232. It is shown as a separate component merely to assist in describing the error code feature.

Green indicator 244 lights up, and preferably blinks, in response to one category of machine errors, while red indicator 246 likewise blinks in response to another category of machine errors. The term "machine error" is used herein for an operating problem that the machine is expected to experience shortly or is already experiencing. For example, a green error (which causes green indicator 244 to blink) does not place the parking machine out of service but, rather, is indicative of an upcoming problem that should be attended to within a day or so. Thus, if the paper supply drops below a predetermined amount, green indicator 244 will blink so that the service person is made aware of a problem simply by looking at the exterior of the parking machine and without having to open it up and peer into it which would require the expenditure of more time on his part. On the other hand, the occurrence of a red error causes blinking of the red indicator 246 and informs the service person that the parking machine is out of order and will not function at all unless the problem is removed. An example of a red error is complete depletion of the paper supply.

Circuit line 248 represents the transmission of all the error signals and control signals from parking machine 212 to memory 240 and to indicator 242 that are required to effect the above-described operation. Examples of such error signals are the following error codes and the error condition which each represents.

TABLE 1

| Error Signals | Error Condition |
|---|---|
| Red errors: | |
| 01 | Paper feed failure. |
| 02 | Paper cutter failure. |
| 03 | No paper in printer. |
| 20 | Coin box full/failed. |
| 30 | Card reader failure. |
| 40 | Power supply failure. |
| Green errors: | |
| 50 | Bill stacker almost full. |
| 60 | Paper roll getting low. |

When either indicator 244 or 246 is blinking, the service person will punch a suitable code into keyboard 228 which allows him access to memory 240 in order to retrieve therefrom the error code and the error condition for viewing on display 220. The appropriate remedial action can then be taken. Implementing this operation is readily apparent to one with ordinary skill in the art and, therefore, no further details are deemed necessary.

Figure 2:
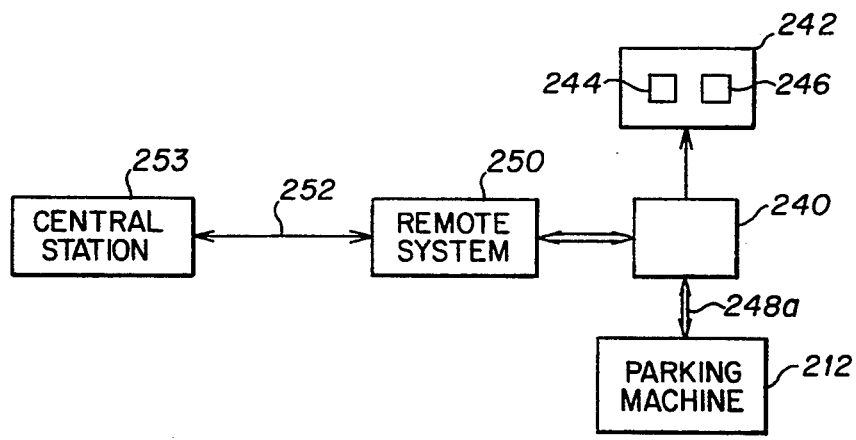
FIG. 2 is a block diagram of the remote monitoring and control system of the present invention.

FIG. 2 shows how the above-described parking machine is modified to effect the remote parking management system of the present invention. Parking machine 212, memory 240 and error indicator 242 are unchanged. A remote monitoring and control system (referred to hereinafter as the "remote system") is represented by block 250 and is described in detail below. It interfaces the parking machine 212 with telephone line 252 having a central station 253 at the other end. Remote system 250 is connected to memory 240. Central station 253 is, for example, an office which accommodates service, supervisory and/or management personnel responsible for a number of parking machines some of which may be at one location (e.g. a parking garage) and others of which may be at various locations (e.g. for on-street parking). Central station 253 can include just a telephone to enable the establishment of communication link with the remote system 250 in each and every one of the parking machines under the responsibility of this central station. If it is desired to control the remote system from the central station, as described below, then a computer and a modem are also required.

Figure 3:
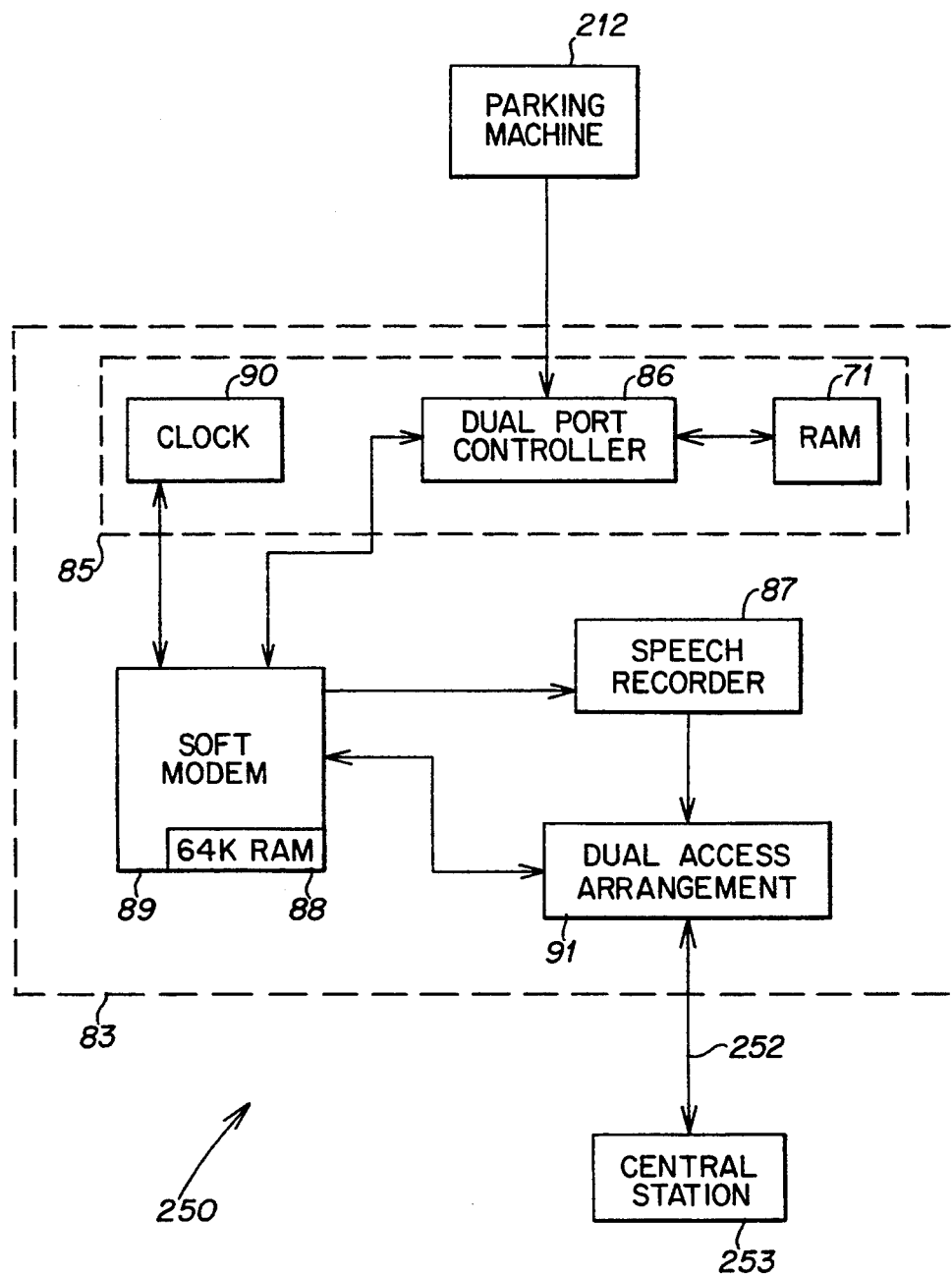
FIG. 3 shows details of a block depicted in FIG. 2.
Figure 4:
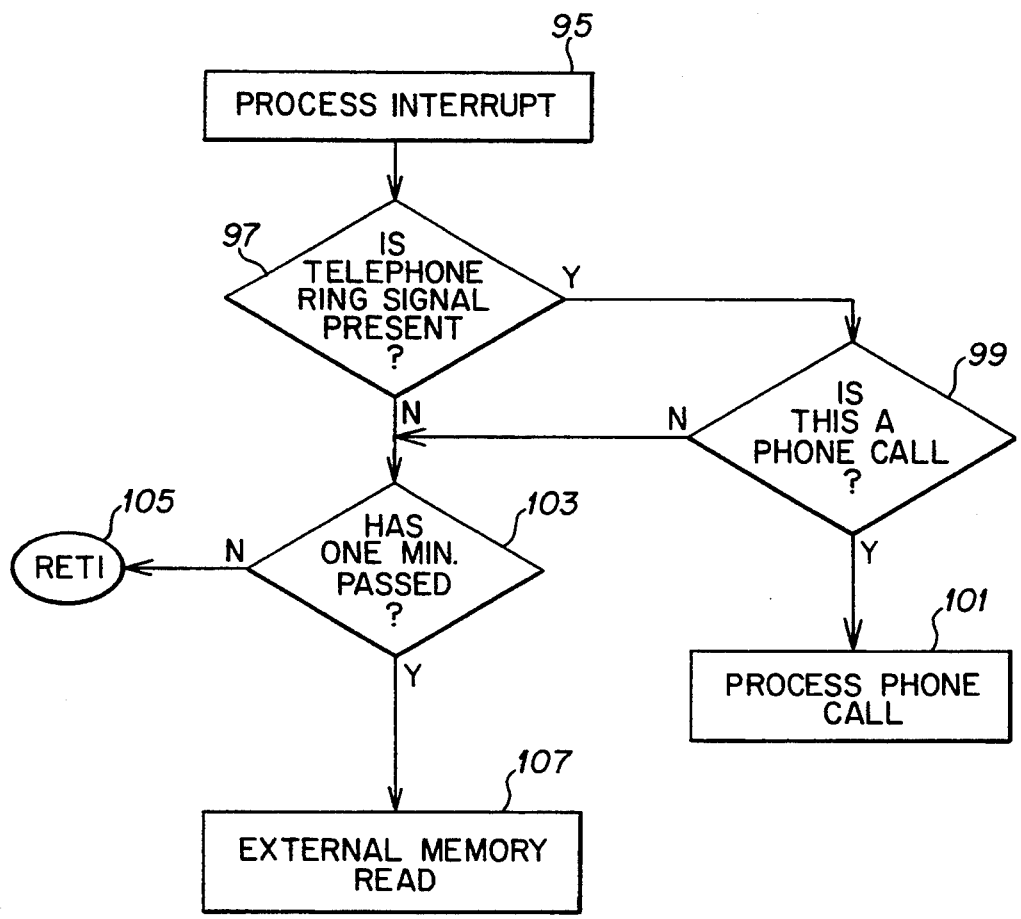
FIG. 4 is a flow chart describing a computer processing interrupt operation performed by the present invention.

FIG. 3 shows the main components of the remote system 250. The remote system is implemented, for example, on a circuit board 83 which is inserted into a ParkMaster parking machine. In its preferred embodiment, board 83 carries four mini-boards, commonly called stiks, manufactured by Dallas Semiconductor. The stiks used in FIG. 3 are known by names assigned to them by Dallas Semiconductor. More specifically, Dual Port RAM 85, Speech Recorder 87, Soft Modem 89 and Dual Access Arrangement 91 correspond, respectively, to stiks identified commercially as DS2230, DS2270, DS2245 and DS2249. In addition to the components shown in FIG. 3, other components are required to operate the remote system, but are not shown in order to avoid unnecessarily complicating the presentation. These additional components include a +5 v regulator which powers all the digital portions of the stiks. A −5 v convertor chip takes the +5 v and converts it for use in powering the analog circuits of the Speech Recorder stik 87. Also, three RJ-11 telephone connectors are included. Two of these are tied directly together in order to string several parking machines together so they can operate off the same phone line. In other words, one of these connectors receives a telephone cord from a parking machine immediately previous to its own machine, and the other of these connectors receives a telephone cord coupled to the next parking machine. Of course, each parking machine has its own circuitry coupled to these connectors to form a T-type of connection. The third connector is used for the service person to connect up to the phone when working at the parking machine. These components are conventional and require no further elaboration. Up to 12 parking machines can be installed on the same phone line.

The Soft Modem stik 89 is the main control for the remote system. Through a serial port, it controls the actions of both the Dual Port RAM stik 85 and the Speech Recorder stik 87. It also acts as the modem for receiving calls and for processing commands sent to it by the service person. It has 64K bytes of encrypted RAM 88 which contains the software and parameter memory for operating the remote system.

The Dual Port RAM stik 85 includes RAM 71, which corresponds to memories 232 and 240 of FIG. 1, and a dual port controller for controlling access to RAM 71. Stik 85 acts as the memory for the parking machine and can be accessed by Soft Modem 89 and by parking machine 212. This stik also contains the real time clock 90 which the remote system uses in processing a phone call, as described below.

RAM 71 is used for storing machine error codes if and when, they are generated during machine operation. Parking machine 212 needs to gain access to RAM 71 to store the error signal which is generated when a problem occurs in one of its components, and Soft Modem 89 periodically checks the contents of RAM 71. Thus, contention between parking machine 212 and stik 89 may occur for access to RAM 71 when a randomly occurring access request by parking machine 212 happens to coincide with a periodic access request by stik 89. Controller 86 arbitrates such contention in a manner described below. RAM 71 is also used to store additional information, such as the fare structure, number of coins, bills and/or cards accepted, the data base for the parking lot (i.e. expiration time and identity of the parked vehicles), and the like, which are stored in memory 232 of ParkMaster described above with regard to FIG. 1.

The Speech Recorder stik 87 contains the processing and control for generating the recorded voice message, as described in detail below. The Soft Modem stik 89 controls stik 87 via a serial port for recording and playing the message. The Speech Recorder 87 also acts to generate the needed DTMF signals because the Soft Modem 89 does not have a tone generator.

The Dual Access Arrangement 91 is the bridge between the remote system and telephone line 252 in the sense that it converts incoming telephone line signals to TTL level signals for Soft Modem 89, and vice versa. It is controlled by the Soft Modem 89 via TTL lines for control of phone hook, ring detection, and data lines in and out. It also acts as the switch for the Soft Modem 89 and a service person phone connection. Such devices are well known and, therefore, no further details are believed necessary.

Further details regarding operation of the present invention will be described in connection with the flow charts presented in FIGS. 4–9. These flow charts represent the software programmed into RAM 88 of Soft Modem stik 89.

Figure 6A:
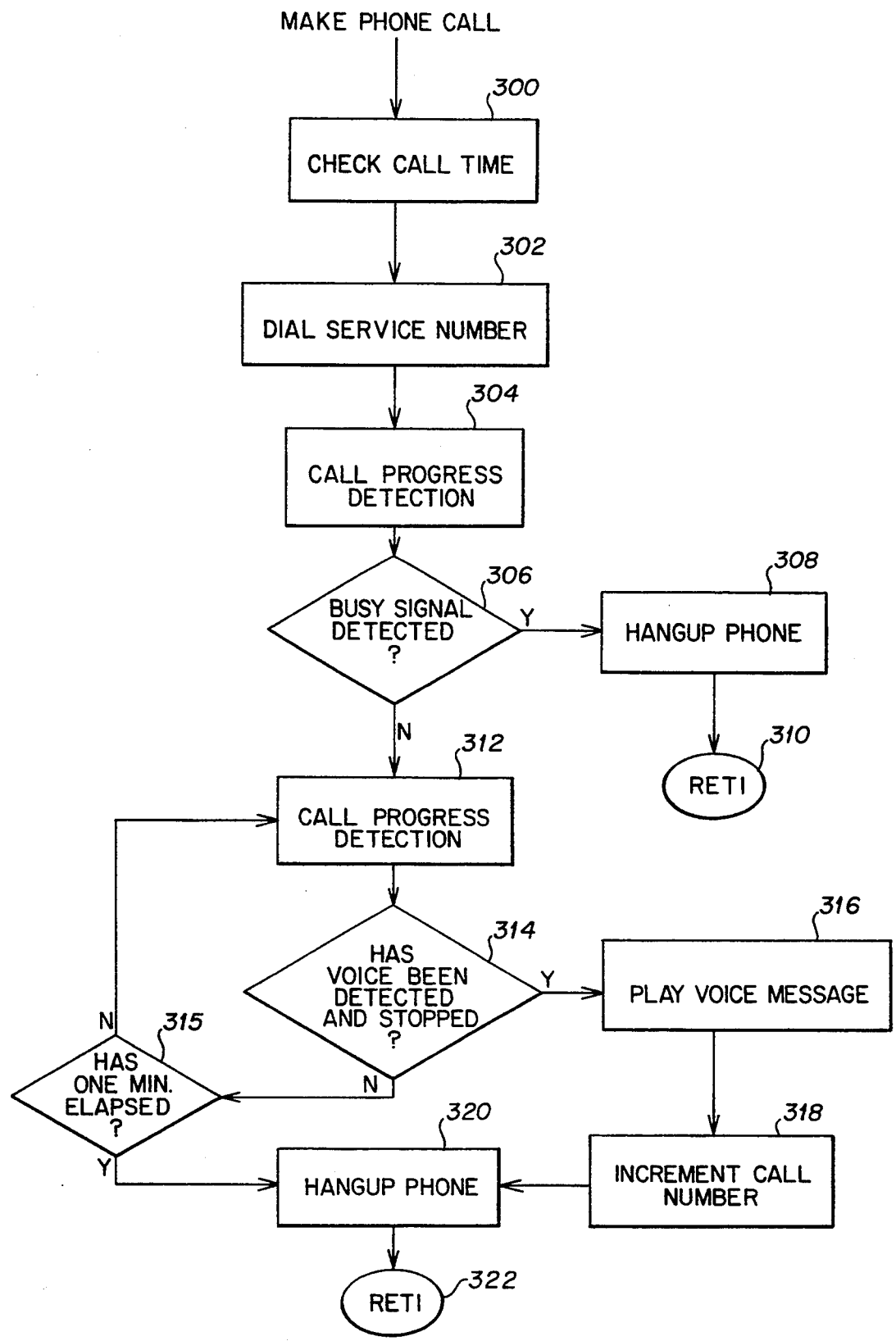
FIGS. 6A to 6E are flow charts describing the "make phone call" function shown in FIG. 5.
Figure 7:
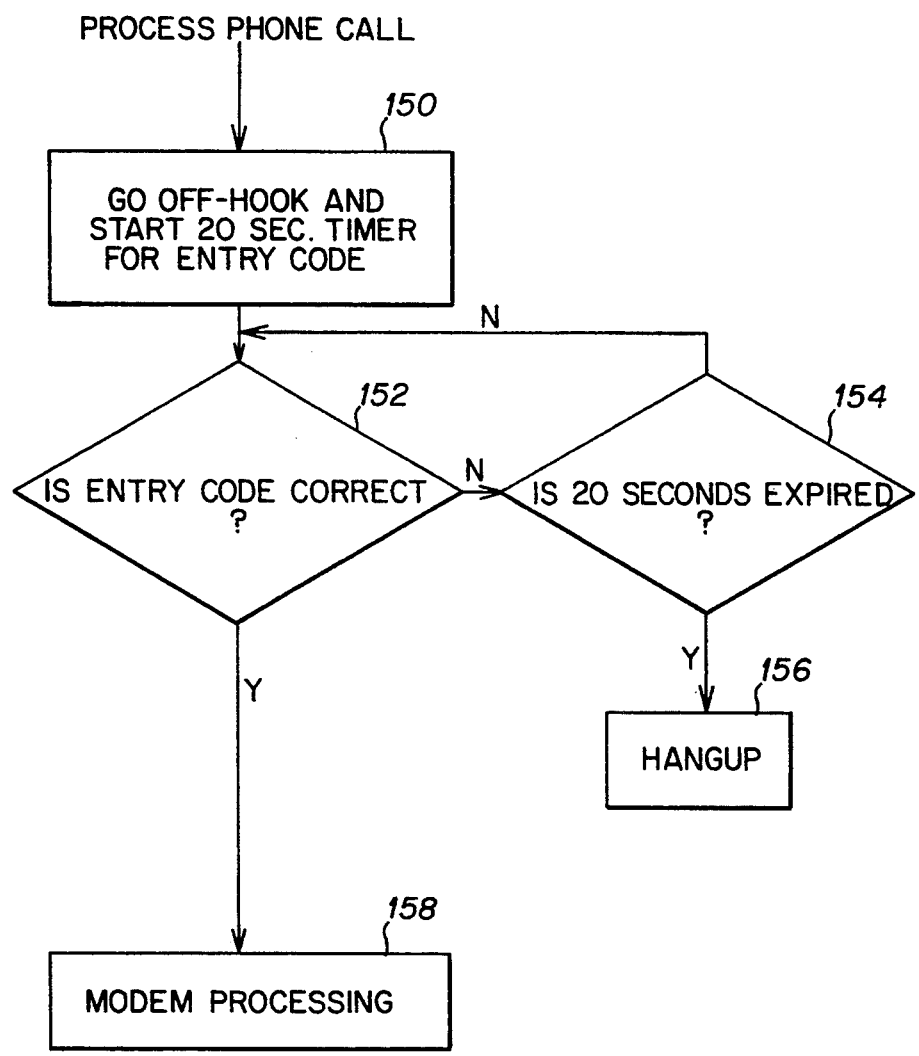
FIG. 7 is a flow chart describing the "process phone call" function shown in FIG. 4.
Figure 8:
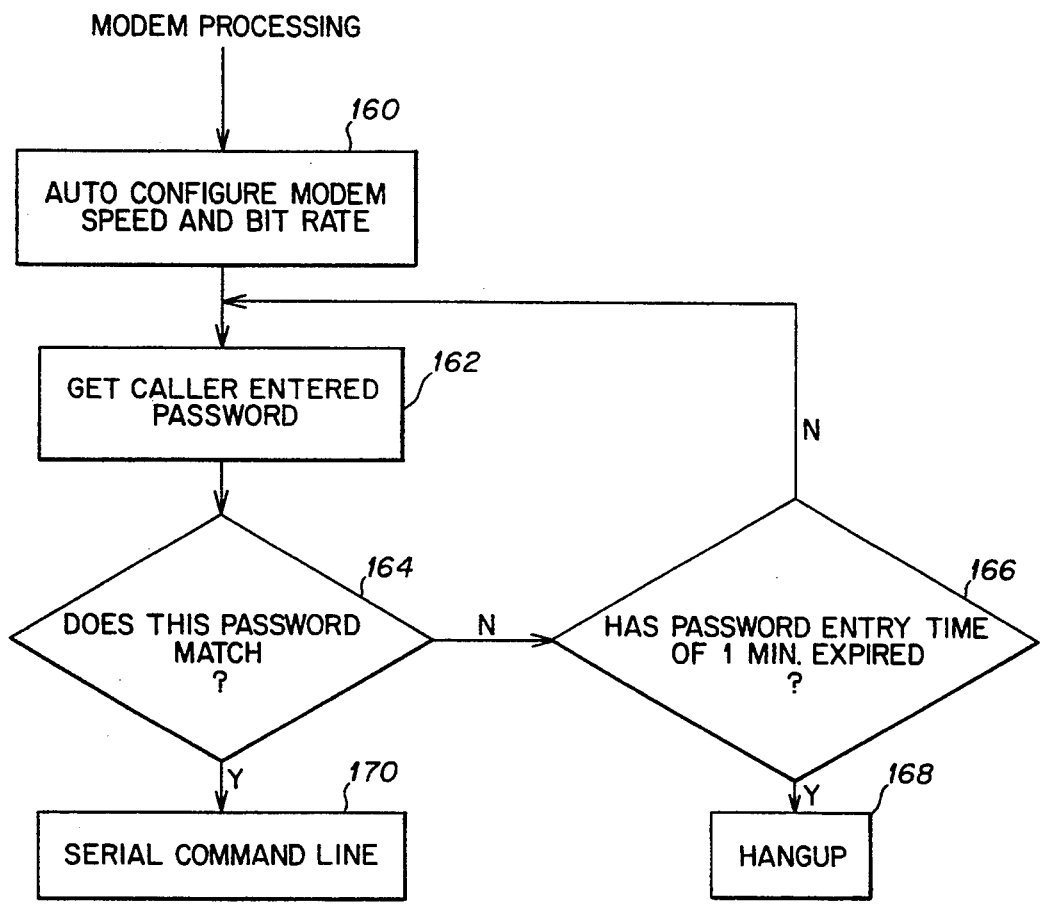
FIG. 8 is a flow chart describing the "modem processing" function shown in FIG. 7.

Operation of the circuitry depicted in FIG. 3 includes an interrupt signal which is generated, per step 95, at intervals of 71 ms. This interrupt has the highest priority and triggers a determination, per step 97, as to whether a telephone ring signal is detected on incoming line 252. If it is, then step 99 determines whether the detected ring signal is a phone call, rather than noise for example, by ascertaining whether the ring time conforms to the telephone standards of the particular country. These parameters vary from country to country and, therefore, such a determination is customized to the locality and, thus, serves to distinguish a telephone ring signal from noise. If the incoming signal passes this test, it is determined that the system is receiving an incoming phone call. If the requisite prestored number of rings has been received, the operation labeled "process phone call" represented by box 101 is initiated. Details of this operation are shown in FIGS. 7–9, as discussed below. If, however, it is determined that the signal is not an incoming phone call, or if by step 97 it is determined that there is no ring signal present on incoming line 93, a determination is made per step 103 as to whether a period of one minute has elapsed from the last time that an "external memory read" operation has been carried out. If not, then operation of the system returns, as indicated by "RETI" box 105 to the particular operation which was interrupted. At intervals of one minute the "external memory read" operation 107 is performed, as described below in connection with FIGS. 5 and 6.

Figure 5:
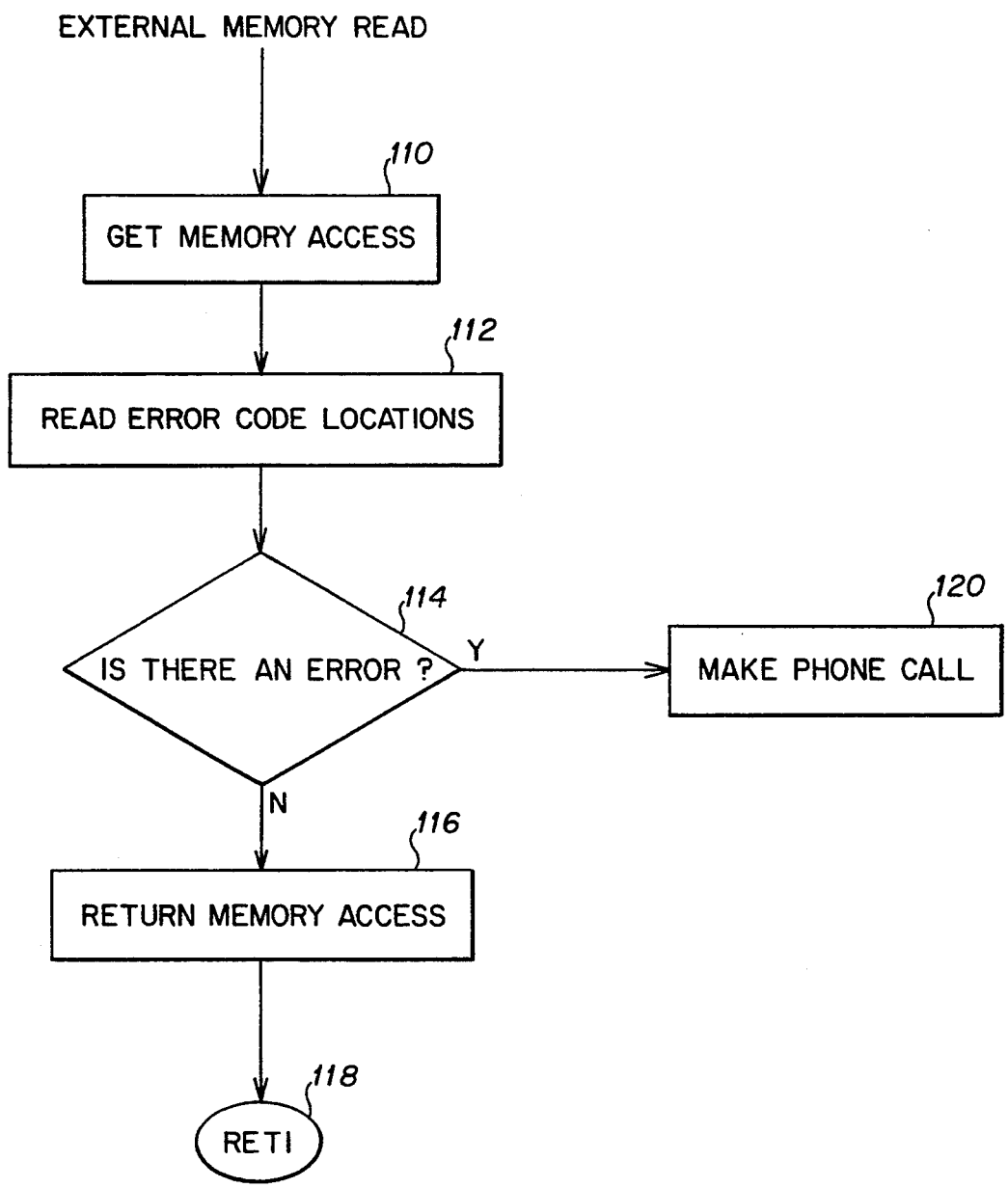
FIG. 5 is a flow chart describing the "external memory read" function shown in FIG. 4.

As mentioned above, RAM 71 is accessed at regular intervals in order to scan its addresses which have been assigned to store error codes. This operation is carried out in order to ascertain whether an error code has been stored, and details thereof are depicted in FIG. 5 as part of the external memory read operation 107 which includes the following steps. Step 110 obtains access to RAM 71 in which the machine error codes are stored. More specifically, RAM 71 has two address locations each being dedicated to storing access flags. When the RAM 71 is available to be accessed by parking machine 212, for example, flag #1 is set at a logic "0". When, however, the parking machine 212 is accessing RAM 71, flag #1 is changed to a logic "1". Thus, when the Soft Modem stik 89 seeks access to RAM 71, it checks the status of flag #1. Likewise, flag #2 is used to indicate whether RAM 71 is being accessed by Soft Modem stik 89. Thus, when parking machine 212 generates an error code which is to be written into RAM 71, the status of flag #2 is first checked and, if flag #2 is a "1", the parking machine 212 must wait until the flag is cleared. (Due to the necessity for two-way communication between RAM 71 and parking machine 212, circuit line 248 of FIG. 1 appears in FIG. 2 as circuit line 248*a*.)

When access to RAM 71 is gained by the parking machine, it sets access flag #1 to "1", and then all of the addresses assigned to the green and red error codes in RAM 71 are read sequentially, per step 112. In the preferred embodiment, there are dedicated memory locations equal in number to the green error codes, but only one memory location is reserved for the red error codes. This is because several green errors can co-exist since none result in immediate shut-down of the parking machine. However, when a red error occurs, the parking machine is immediately blocked from further operation so that only one red error is likely to exist at any given time. Thus, only one memory location is needed for the red error codes. Step 114 determines whether an error code has been retrieved from RAM 71. (The error codes have been listed above in the Table 1.)

If no error code is stored in RAM 71, then flag #1 is reset to "0" per step 116, and the remote system returns to whichever point it was at when interrupted, as per step 118.

If step 114 indicates that an error code has been retrieved from RAM 71, the "make phone call" operation represented by box 120 in FIG. 5 is carried out. Details of this operation are shown in FIGS. 6A to 6E. In particular, FIG. 6A depicts the main steps for implementing the "make phone call operation" 120 of FIG. 5, whereas FIGS. 6B to 6E provide details of various steps which are set forth in FIG. 6A. Thus, when step 114 determines that an error code is stored in one of the assigned address locations in RAM 71, step 300 of FIG. 6A consults the clock 90 to ascertain the time at which the phone call is to be made. Step 302 selects the appropriate number to dial depending on the time of day, as explained below. Call progress detection step 304 monitors the telephone line for six seconds to determine whether the dialed number returns a ring signal or a busy signal. This monitoring is done generally the same way for step 304 as well as for steps 312 and 362 discussed below. During the six seconds, the line is checked a number of times, such as 1000, to compare the signal amplitude on the line against a threshold. If the threshold is exceeded at least approximately 90% of the time, the line is regarded as having a dial tone on it (step 362); approximately 40% is regarded as a busy signal (step 304); approximately 20% as a ring (step 97); and approximately 5% as voice (step 312).

Step 306 determines whether the placement of the call produces a busy signal at the other end. If a busy signal is detected, then step 308 ends the call by hanging up the phone, and the operational flow returns per step 310 to the point at which it was interrupted. If, however, no busy signal is detected, then call progress detection step 312 determines whether a voice signal has been detected at the other end, as explained above. The system is set up to respond to a brief occurrence of voice shorter than the six second monitoring interval, such as "Hello, hello" followed by silence. Thus, if step 314 determines that a brief voice response has been detected from the central station, then after termination thereof the parking machine plays a voice message to the central station, per step 316, details of which are provided below. After step 316 is completed, a counter is incremented by one, per step 318, to keep track of the number of error calls that have been made to the central station following the detection of a stored error code. (This counter is reset by the service person after the parking machine is serviced.) The machine then hangs up the phone per step 320, and returns to wherever the operational flow was at prior to occurrence of the interrupt, as per step 322. If, however, step 314 determines that either no voice has been detected or that the voice signal is continuing throughout the six second monitoring interval, then the operational flow proceeds immediately to a one-minute loop, per steps 315 and 312. When the one-minute expires, steps 320 and 322 hang up the phone and return operation to whichever step was interrupted.

Figure 6B:
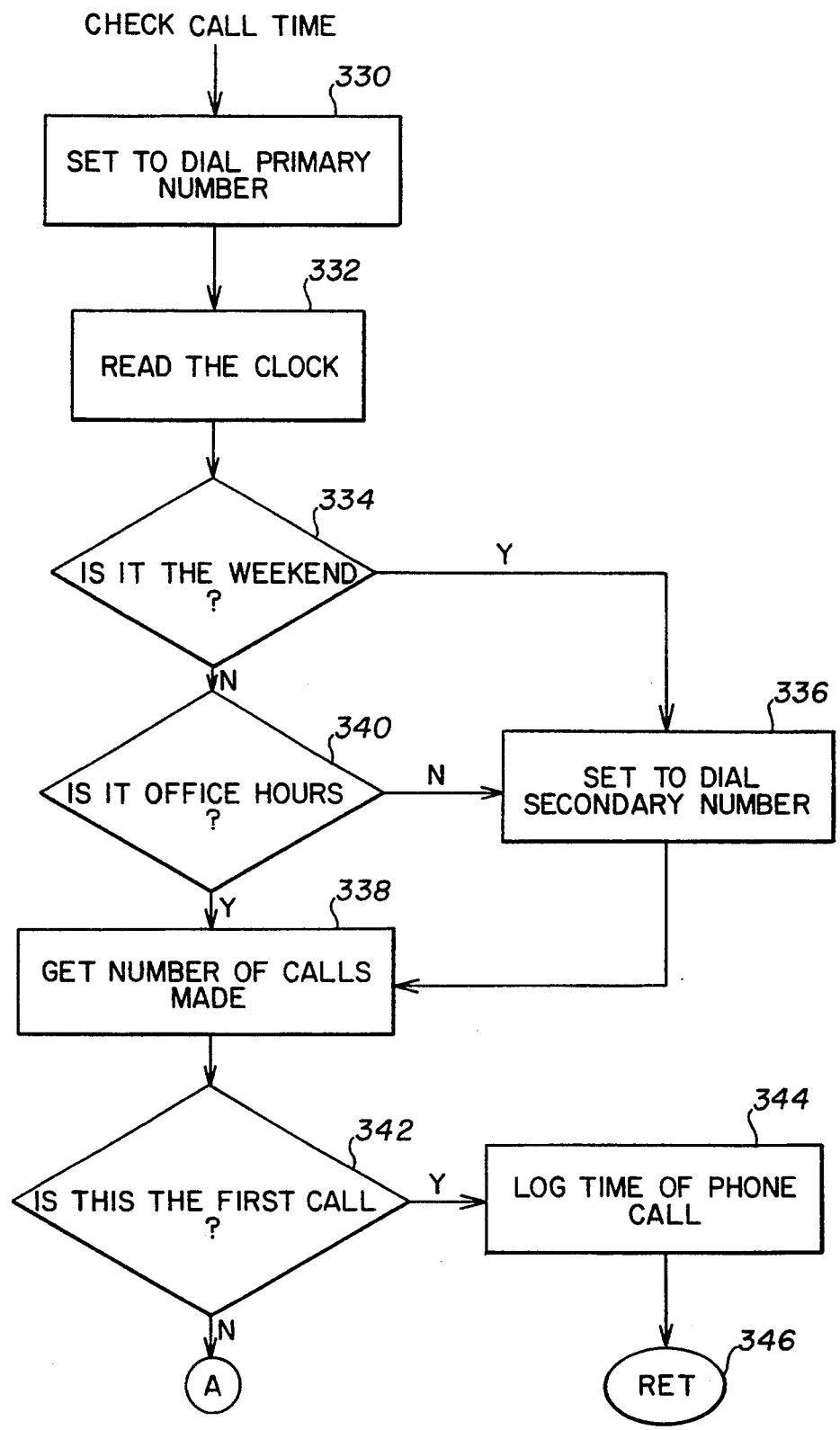
Figure 6C:
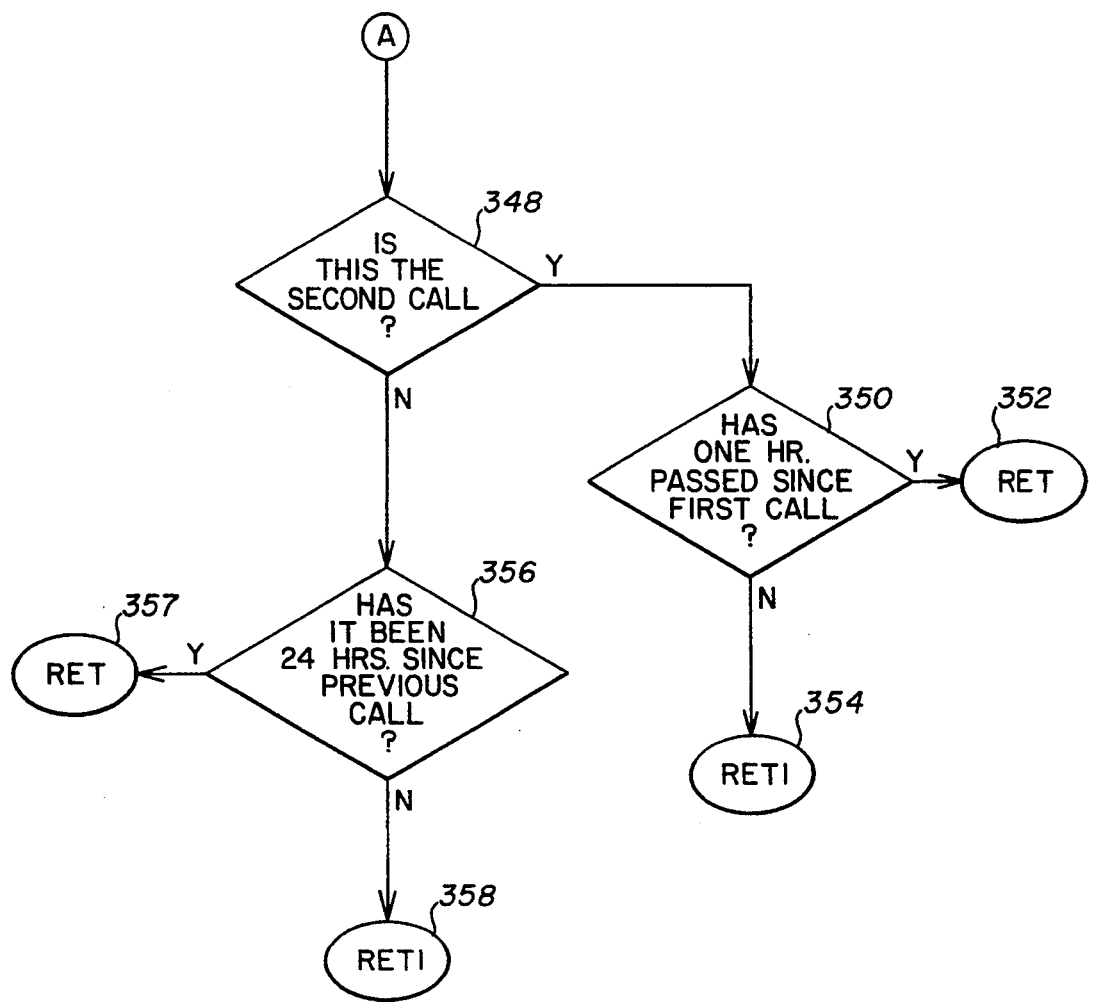

FIG. 6B provides details of the "check call time" step 300 in FIG. 6A. The system can be set to dial one of two possible telephone numbers, namely a primary number and a secondary number, depending on the time of day. The primary number is used during normal office hours, whereas the secondary number is used for all other times. For example, the primary number is that of the central station 253, and the secondary number might be the home of a service person who is to be reachable 24 hours per day, 7 days per week. Thus, it is only necessary to dial the primary number during office hours in order to reach the service person. The system is initially set by step 330 to dial the primary number. Step 332 consults clock 90 to determine the present time and date. If the date falls on a weekend, as determined by step 334, then step 336 sets the telephone number to the secondary number. Step 338 then checks the number of calls which have already been made, and which are kept track of in accordance with step 318 discussed above in connection with FIG. 6A.

If step 334 determines that the date is not a weekend day, i.e. that it is a week day, then step 340 checks whether the time falls during normal office hours. If it does not, then the operational flow proceeds to step 336 to set the number to be dialed to the secondary number. If step 340 determines that the current time occurs during normal office hours, then the operational flow proceeds to step 338. Step 342 then determines whether this is the first call being made responsive to the detection of a stored error signal. If it is, then step 344 logs the time in order to determine when the error occurred, and then "return" step 346 returns the operational flow to the "dial service number" step 302 of FIG. 6A.

If step 342 determines that the call being made is not the first call, then step 348 determines whether the call being made is the second call. If it is, then step 350 checks whether an hour has elapsed from the first call.

If it has, then the call is placed by virtue of step 352 which returns the operational flow to step 302 of FIG. 6A. If an hour has not yet elapsed, then the system returns, per step 354, to whatever operation it was conducting when the interrupt occurred.

If step 348 determines that the call being made is neither the first nor the second call, then step 356 checks whether 24 hours have elapsed since the previous call. If 24 hours have elapsed, then step 357 returns the operational flow to step 302 of FIG. 6A so that a call can be placed. Otherwise, step 358 returns the operational flow to whatever step was interrupted.

Figure 6D:
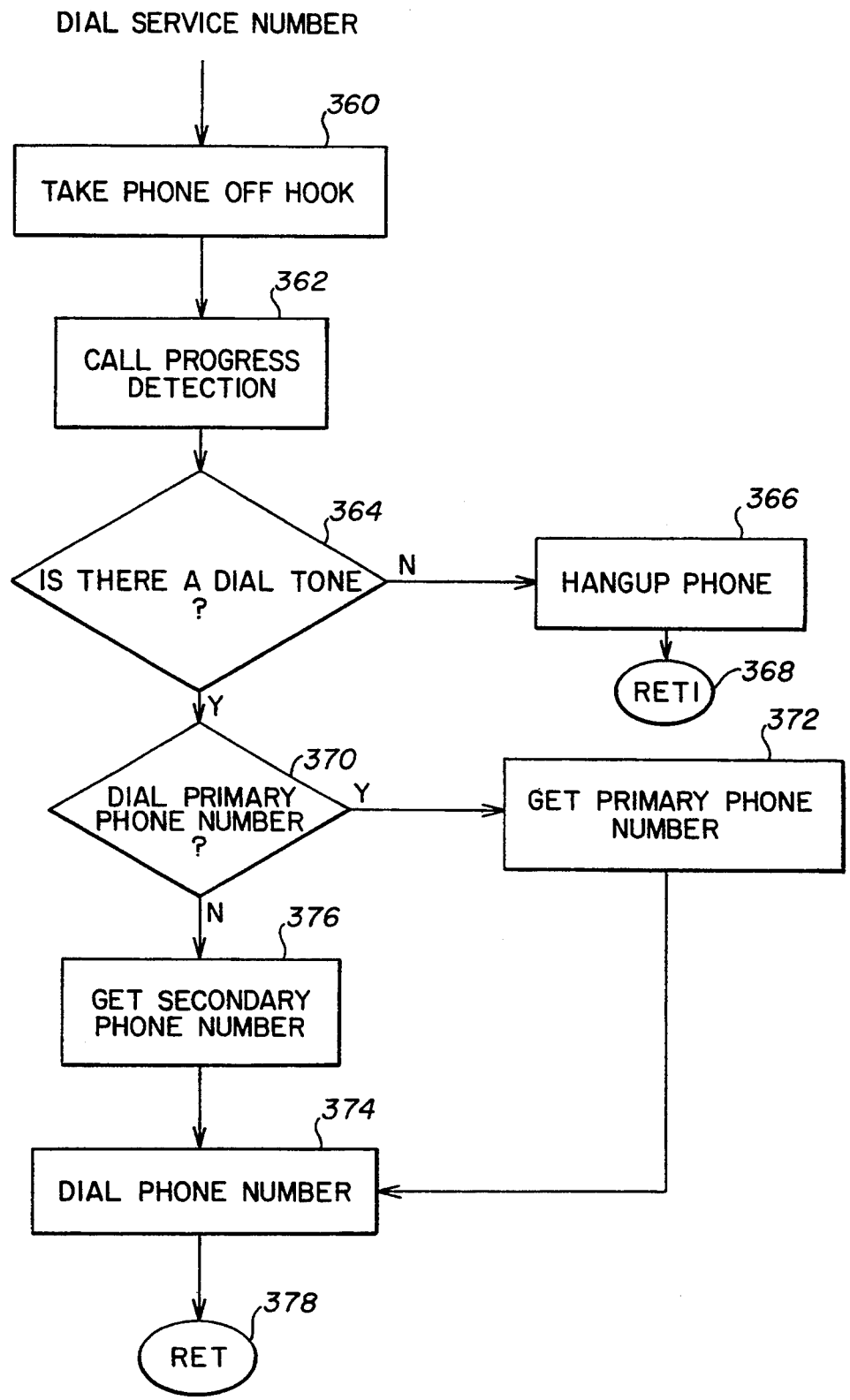

FIG. 6D provides details regarding the "dial service" number step 302 of FIG. 6A. More specifically, step 360 takes the phone off the hook, and step 362 conducts a "call progress detection" operation which determines during a six second interval whether a dial tone is detected, as explained above. Step 364 checks whether there is a dial tone, and if not then step 366 hangs up the phone and step 368 returns the operational flow to where it was interrupted. If, however, a dial tone is detected, then step 370 determines whether the primary phone number is to be used in accordance with the determination made by steps 330, 332, 334, 336 and 340 of FIG. 6B. If so, then step 372 retrieves the primary phone number, and step 374 dials it. This is done with the assistance of speech recorder 87 which generates the needed DTMF signals, as explained above.

If step 370 determines that the primary phone number is not to be used, then step 376 retrieves the secondary phone number and step 374 dials it. With that being done, step 378 returns the operational flow to step 304 of FIG. 6A.

Figure 6E:
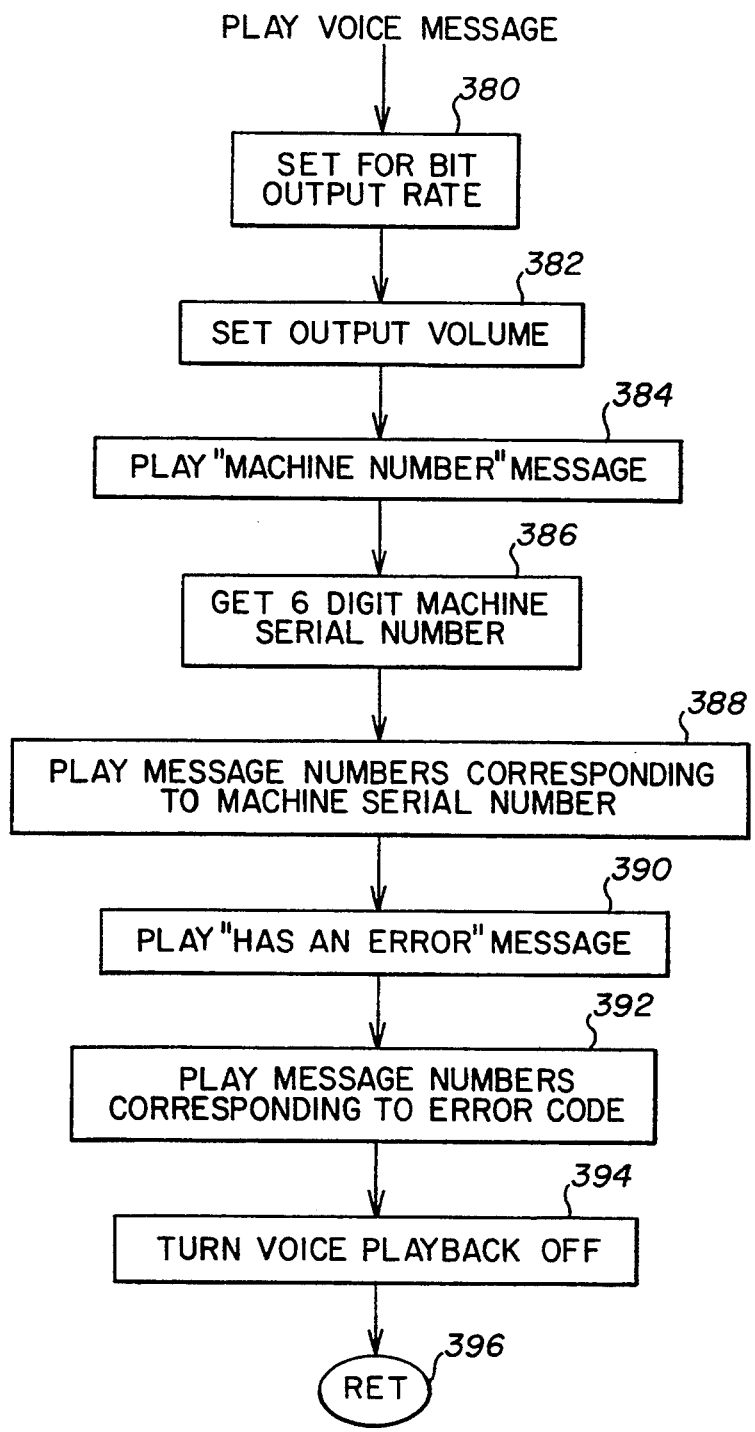

FIG. 6E provides details of the "play voice message" step 316 of FIG. 6A. However, before discussing FIG. 6E, it is necessary to explain that, in accordance with the present invention, 12 voice messages are pre-stored in Speech Recorder 87. These messages are shown in Table 2.

TABLE 2

| Message No. | Voice Message |
| --- | --- |
| 1 | zero |
| 2 | one |
| 3 | two |
| 4 | three |
| 5 | four |
| 6 | five |
| 7 | six |
| 8 | seven |
| 9 | eight |
| 10 | nine |
| 11 | machine number |
| 12 | has an error |

The present invention synthesizes the voice message from the twelve stored messages listed above in Table 2. More specifically, step 380 sets the bit output rate from memory to one that is best suitable to derive intelligible playback given the circuit parameters and components being utilized relative to the parameters of the phone line. Step 382 sets the output volume of the voice. Steps 380 and 382 are a standard aspect of the operational capabilities of Speech Recorder 87. In step 384, message number 11 is retrieved and played, namely the words "machine number". In step number 386, the six-digit serial number of the machine is retrieved, and step 388 plays the messages whose numbers correspond to that serial number. Thus, if the serial number of that particular machine happens to be 471960, then corresponding message numbers 5, 8, 2, 10, 7 and 1 will be retrieved and played. In step 390, message number 12 is retrieved and played, namely the words "has an error".

In step 392, the two-digit error code obtained from RAM 71 is converted into the corresponding message numbers which are retrieved and played. Thus, for a green error 60, message numbers 7 and 1 will be retrieved and played. If several green errors are stored, only one will be retrieved, namely the one which is reached first in the sequence with which the memory addresses are scanned. The result of performing steps 384, 386, 388, 390 and 392 is the voice synthesis of the message "machine number 471960 has an error 60". This message is transmitted via a phone line to the service person in order to inform him of the identity of a particular parking machine as well as the nature of the error in that machine. From the serial number and suitable charts in his possession, the service person can determine the location of the parking machine, and from the error code he can determine the error condition.

After the synthesized voice message has completed its playback, step 394 turns off the playback operation, and step 396 returns the operational flow to step 318 of FIG. 6A.

The present invention makes it possible for central station 253 to access any parking machine 212 hooked up to a phone line. A service person located at the central station dials the number of the telephone line to which parking machine 212 (along with several others) is coupled. This is treated by each parking machine 212 on the line as an incoming phone call.

Incoming calls to a parking machine 212 from central station 253 consist of calls to change parameters of the remote system and to view the ParkMaster memory. The incoming call process is as follows:

1. The Dual Access Arrangement signals the Soft Modem that a ring has been detected.
2. The Soft Modem tells the Dual Access Arrangement to go off hook.
3. The Soft Modem then waits for an entry code in the form of a DTMF tone. If the correct code is not sent within 20 seconds, the system will hang up.
4. If the correct code is received, modem communications begins and the Soft Modem asks for the caller's password.

The caller then enters his password to gain access to the system. If the wrong password is entered, a number of other chances are given until the system hangs up about a minute later. A correct password entry allows the caller to enter commands.

Let us now proceed to a description of the "process phone call" operation 101 as depicted in FIGS. 7–9B. When this operation begins, it has already been determined per function 99 (see FIG. 4) that there is an incoming phone call. When this condition of an incoming phone call is detected, all the parking machines which are on the same telephone line, and this can be up to twelve parking machines, go off-hook. Each parking machine then allows a 20 sec. duration to receive a preselected DTMF entry code, as per box 150. A unique entry code is pre-stored in the remote system of each parking machine, and the incoming entry code is compared by step 152 with the pre-stored entry code in a conventional manner. The entry code could be the serial number of the parking machine since a unique serial number is assigned to each machine. If the allotted 20 sec. period expires, per step 154, without the prestored entry code having been detected, the parking machine hangs up per box 156 and, thereby, returns to its on-hook condition. In the normal situation, an entry code will be transmitted which corresponds only to one of the parking machines that are on the same telephone line. Thus, at the end of the 20 sec. interval only the particular parking machine whose pre-stored entry code is matched by the transmitted entry code will remain off-hook. This arrangement is advantageous in terms of sharply reducing the number of telephone lines that are required to gain remote access to a plurality of parking machines. Only one line is required for up to 12 parking machines and the costs are, thus, commensurately reduced.

If the detected entry code matches that which has been pre-stored, then the operation flows to the "modem processing" function represented by box 158, the details of which are provided in FIG. 8. In FIG. 8, box 160 represents the steps undertaken to automatically configure the speed and bit rate of the modem to match those of the modem at the other end of the received call. This is a standard, well known operation which requires no further explanation. Once that is done, the caller (i.e. the service person who has dialed up) must enter a security password, as per step 162, and step 164 determines whether the transmitted password matches one which has been pre-stored in the remote system. The same password can be used for all of the parking machines, although it is also possible to change this arrangement. The caller is given a preselected amount of time, as per box 166, to enter the correct password. As long as this period of time, such as one minute, does not expire, the system loops back to box 162. However, once the allotted time expires, the parking machine hangs up, as per box 168. If, however, the received password matches the pre-stored password, the system proceeds to the "serial command line" operation represented by box 170 and described in greater detail in FIGS. 9A and 9B. The "command line" refers to a line on the terminal used at the central station and on which appears the command character when it is typed on the keyboard.

Figure 9A:
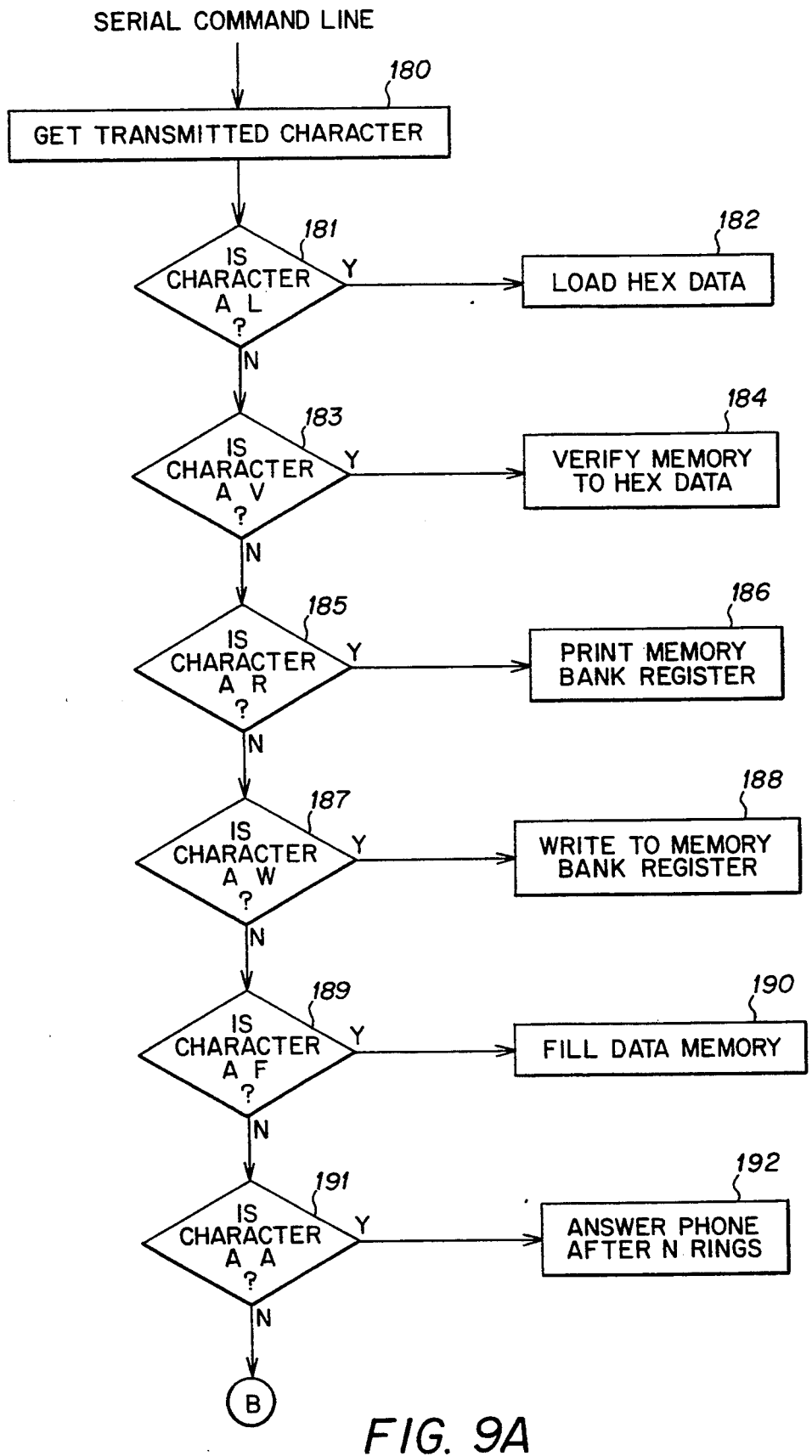
FIGS. 9A and 9B are flow charts describing the "serial command line" function shown in FIG. 8.
Figure 9B:
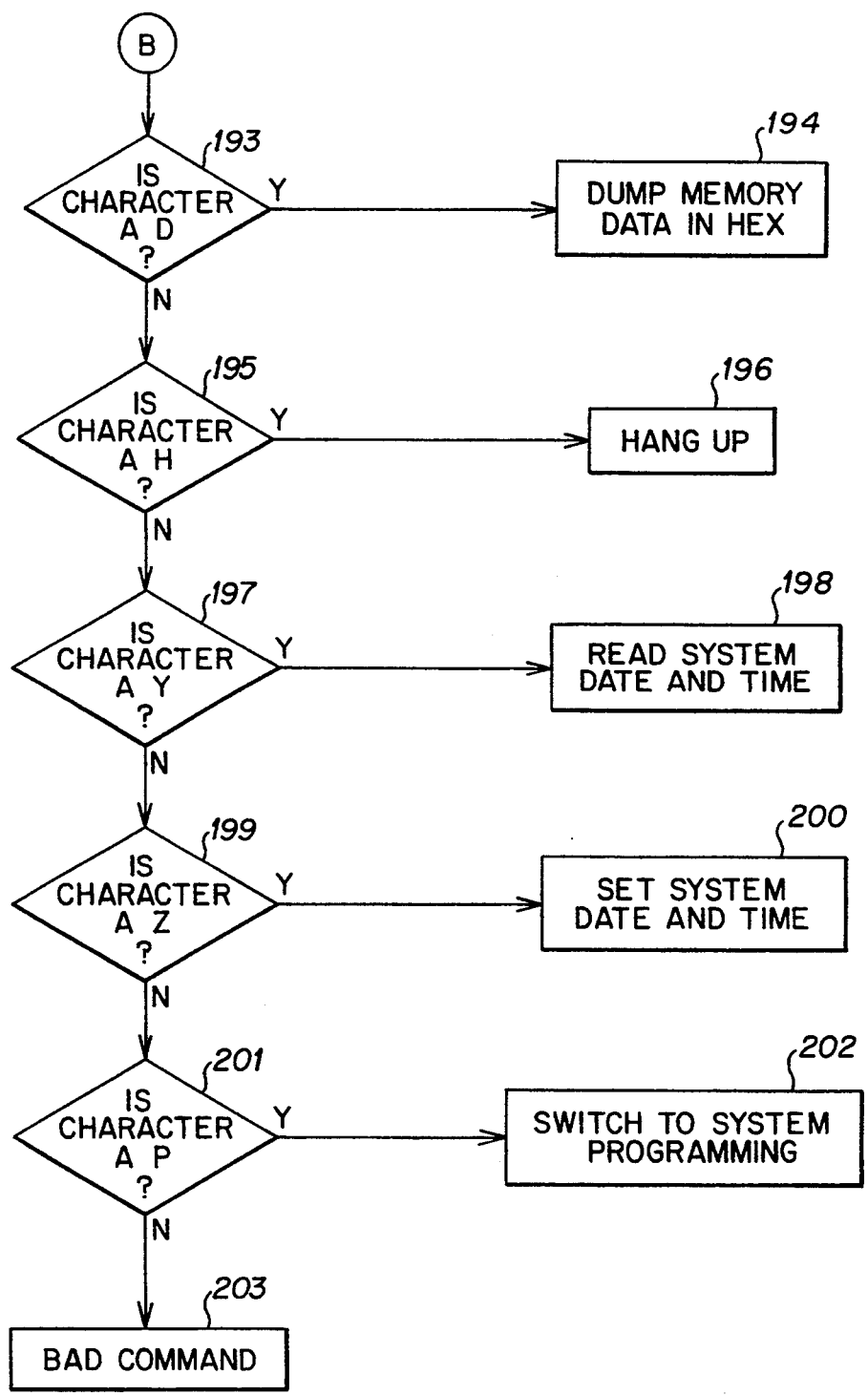

Once the above-described "handshaking" between the transmitting modem at the central station and the receiving modem at the parking machine has been completed, as per FIG. 8, a prompt is displayed on the terminal available to the caller at the central station. When the prompt is displayed, the caller types one or more alphanumeric characters, and then transmits. When the transmission is received by the control system, it is used to trigger a particular operation. FIGS. 9A and 9B show each of the various characters which are searched for by the remote system and, when a particular one is detected, what the operation is which it triggers. Step 180 receives the character transmitted by the caller. Steps 181 to 202 perform individual checks through all of the characters which the remote system is set up to expect, and suitably responds to each such character. If none of the expected characters is detected, step 203 regards the received character as a bad command, and no action is taken by the parking machine. The following commands allow the caller to view and modify the contents of RAM 71. These are listed in conjunction with the corresponding steps shown in FIG. 9

L—Puts memory in load data mode to accept data. (steps 181, 182)

V—Puts memory in verify mode to verify that data is loaded correctly. (183, 184)

R—Display the number of the memory bank register, out of four possible registers, being accessed. (185, 186)

W XX—Write data XX to the memory bank register. (187, 188)

F XX AAAA BBBB—Fill memory with data XX at address AAAA to BBBB. (189, 190)

A XX YY—Set XX minimum rings, YY maximum rings. (191, 192)

D AAAA BBBB—Display memory from address AAAA to BBBB. (193, 194)

H—Session complete. Hang up phone. (195, 196)

Y—Read system date and time. (197, 198)

Z MMDD YYdd hhmm—Set system and time. MM=month, DD=day, YY=year, dd=day of week, hh=hour, and mm=minutes. (199, 200)

All the following P commands correspond to steps 201 and 202:

P1 PPPP PPPP PPPP—Set system primary phone number.

P2 PPPP PPPP PPPP—Set system secondary phone number.

PG XX—Set volume of voice message (XX can be 00 to FF).

PC AA BB—Set call times for primary number. AA—earliest call time and BB=latest call time.

PD XX—Set password DTMF number (XX can be 00 to OF).

PM XXXX XXXX XXXX—Set serial number of parking machine.

PR—Display list of programmed parameters.

It is readily understood that step 201 represents a plurality of steps for sequentially checking for each two character combination starting with a P. Likewise, step 202 represents the functions to be carried out in response thereto.

A service person at the central station can view the memory contents of RAM 71. In particular, the service person can check addresses in the RAM 71 (he needs to specify a memory address) such as those corresponding to the transaction buffer, number of coins accepted, amount of time since power failure, etc. This is done with character D per step 194. It is also possible for the service person at the central station to enter commands to the remote system in the parking machines such as to read and/or set the time and date of the remote system, such as clock 88 (commands Y, Z, steps 197–200), primary and secondary phone numbers (commands P1 and P2, steps 201, 202), primary call times (command PC, steps 201, 202), and set serial number of parking machine (command PM steps 201, 202).

Figure 10:
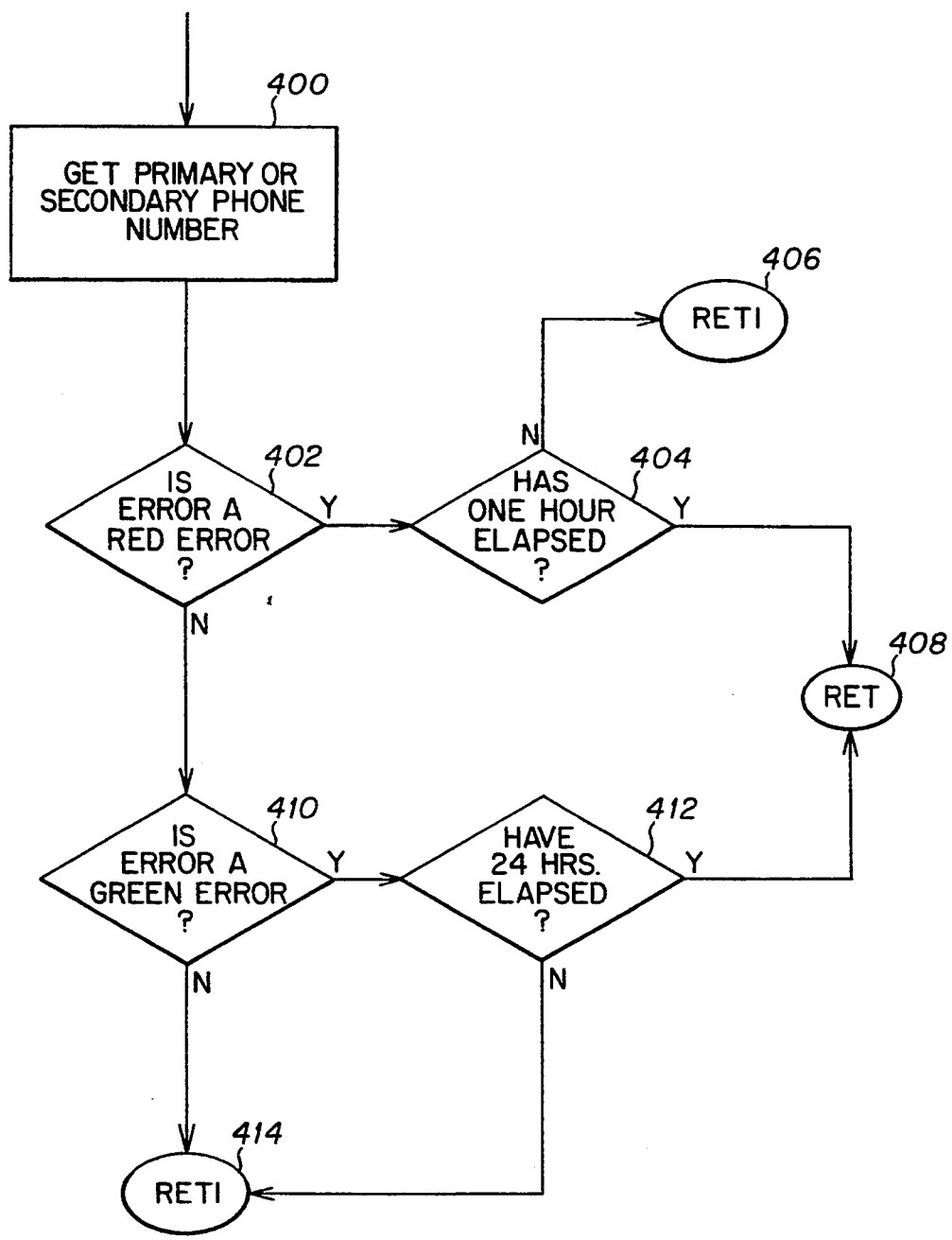
FIG. 10 is a flow chart directed to a second embodiment of the invention.

FIG. 10 discloses another embodiment of the invention which controls the frequency of re-dialing the central station (or the service person at another location during non-office hours, as explained above) based on whether the error is a red error or a green error. The aim is to repeat the effort to have the parking machine serviced, with the repetition being carried out at relatively close intervals for a red error because the parking machine is then in a disabled state and cannot be used. Consequently, having it serviced promptly is an urgent matter. With a green error, on the other hand, the parking machine remains usable and, therefore, it is less urgent to make contact with the central station and obtain service. Repetition of the effort is, thus, done at longer intervals.

Turning to FIG. 10, it depicts step 400 which obtains either the primary or secondary phone number. In this regard, step 400 represents steps 330, 332, 334, 336 and 340 of FIG. 6B. The result of step 400 is whichever of these two phone numbers is correct for the time of day and the day of the week current at the time the step is being performed. Step 402 determines whether the stored type of machine error is a red error or a green error. This can be done for example, with a look-up table to which the error codes are applied as inputs, and the output is a signal indicative of one or the other of these types of errors. If a red error is detected, step 404 determines whether one hour has elapsed from the last call to the central station. If less than one hour has elapsed, then step 406 returns the operational flow to whichever step was interrupted. Otherwise, step 408 returns to step 302 of FIG. 6A to proceed with the dialing steps.

If step 402 yields a negative result, then step 410 checks whether the error code corresponds to a green error. If so, step 412 determines whether 24 hours have elapsed since the last call. If 24 hours have not elapsed, then step 414 duplicates step 406. Otherwise, step 412 leads to step 408 described above.

Although a specific embodiment of the present invention has been described in detail above, various modifications thereto will be readily apparent to one with ordinary skill in the art. For example, the number of error code locations in RAM 71 is a matter of engineering choice, as is the number of parking machines connected to a common telephone line. Also, the interval for repeating the dialing for red and green errors can be selected to be other than one hour and one day, respectively. In addition, all of the stored green errors can be included in the voice message to the central station rather than just one. Furthermore, the nature and number of error codes can be varied to suit a particular machine and/or environment. Moreover, instead of the audible message identifying the machine error by its numerical code, an alphanumeric and/or a word description could be used. Likewise, the serial number of a parking machine could be a combination of alphanumeric characters. Also, the central station could be set up to receive the message from the parking machines for display on a personal computer (PC) rather than by way of an audible message. The PC could generate a voice response automatically when called by a parking machine to simulate the voice of service personnel. Finally, other ways are known for detecting whether a dial tone, ring, busy signal or voice is present on a telephone line. Any of these can be substituted for the one described above. All these and other such modifications are intended to be included within the scope of the present invention as defined by the following claims.

We claim:

1. A system of parking machines communicating over telephone lines with service personnel who are using communication apparatus, comprising:
   a plurality of parking machines connected to the same telephone line;
   the communication apparatus used by the service personnel including
   (a) dialing means for ringing said telephone line, and
   (b) input means for generating a unique entry code for each of said plurality of parking machines;
   each of said plurality of parking machines including
   (a) detecting means for detecting a ring on said telephone line and for producing an off-hook condition in response thereto, and
   (b) control means for maintaining said off-hook condition in response to receipt of said unique entry code for such parking machine.

2. The system of claim 1, wherein said control means returns its parking machine to an on-hook condition if said unique entry code is not received within a preselected time interval after the off-hook condition is produced.

3. The system of claim 2, further comprising means in said communication apparatus for generating a password, and means in each of said plurality of parking machines responsive to receipt of said password for enabling communication between such parking machine and said communication apparatus.

4. The system of claim 3, wherein each of said plurality of parking machines includes memory means for storing said entry code and said password for comparison with the entry code and password received, respectively, from said communication apparatus.

5. The system of claim 2, wherein each of said plurality of parking machines includes memory means for storing said entry code for comparison with the entry code received from said communication apparatus.

6. The system of claim 1, further comprising means in said communication apparatus for generating a password, and means in each of said plurality of parking machines responsive to receipt of said password for enabling communication between such parking machine and said communication apparatus.

7. The system of claim 5, wherein each of said plurality of parking machines includes memory means for storing said password for comparison with the password received from said communication apparatus.

8. The system of claim 1, wherein the communication apparatus is at a central station.

* * * * *